(12) United States Patent
Tomita (10) Patent No.: US 11,220,141 B2
(45) Date of Patent: Jan. 11, 2022

(54) PNEUMATIC TYRE

(71) Applicant: SUMITOMO RUBBER INDUSTRIES, LTD., Hyogo (JP)

(72) Inventor: Shintaro Tomita, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 177 days.

(21) Appl. No.: 16/459,798

(22) Filed: Jul. 2, 2019

(65) Prior Publication Data

US 2020/0023690 A1  Jan. 23, 2020

(30) Foreign Application Priority Data

Jul. 17, 2018 (JP) .............................. JP2018-134375

(51) Int. Cl.
*B60C 15/06* (2006.01)
*B60C 9/02* (2006.01)
*B60C 3/04* (2006.01)

(52) U.S. Cl.
CPC ...... *B60C 15/0603* (2013.01); *B60C 15/0607* (2013.01); *B60C 2015/061* (2013.01)

(58) Field of Classification Search
CPC ............ B60C 15/0628; B60C 15/0603; B60C 2015/061; B60C 3/04; B60C 9/0292; B60C 15/06; B60C 15/0607
See application file for complete search history.

(56) References Cited

U.S. PATENT DOCUMENTS 4,867,218 A * 9/1989 Asano ................ B60C 3/04
   152/454
4,884,610 A * 12/1989 Saito ................ B60C 3/04
   152/454

(Continued)

FOREIGN PATENT DOCUMENTS

EP  3059102 A1  8/2016
EP  3315327 A1  5/2018

(Continued)

OTHER PUBLICATIONS

Machine Translation: JP-2017056815-A, Haneda Yoshihiro, (Year: 2021).*

(Continued)

*Primary Examiner* — Kendra Ly
(74) *Attorney, Agent, or Firm* — Greenblum & Bernstein, P.L.C.

(57) ABSTRACT

A pneumatic tyre includes a carcass extending between bead cores disposed in respective bead portions through a tread portion and sidewall portions, and bead apex rubbers each extending radially outwardly from the respective bead cores, each bead apex rubber having an inner side surface in a tyre axial direction. In a tyre cross-section under a standard inflated state, a ratio h1/H of a carcass-maximum-width height h1 to a carcass-maximum height H is equal to or less than 50%, and in at least one bead portion, an angle of a tangent line touching the inner surface of the bead apex rubber at an intersection of a tyre radial reference line passing a rim-width location of the standard wheel with the inner side surface of the bead apex rubber is in a range of from 55 to 75 degrees to the tyre radial reference line.

14 Claims, 4 Drawing Sheets

(56) References Cited

U.S. PATENT DOCUMENTS

| | | | |
|---|---|---|---|
| 5,016,697 A * | 5/1991 | Noma | B60C 3/04 |
| | | | 152/454 |
| 2013/0048183 A1* | 2/2013 | Ichihara | B60C 9/28 |
| | | | 152/526 |
| 2016/0236521 A1* | 8/2016 | Yukawa | B60C 17/0009 |

FOREIGN PATENT DOCUMENTS

| | | | | |
|---|---|---|---|---|
| JP | 5161901 A | * | 5/1976 | |
| JP | 03169709 A | * | 7/1991 | |
| JP | 2007106174 A | * | 4/2007 | |
| JP | 2017056815 A | * | 3/2017 | |
| JP | 2017-121875 A | | 7/2017 | |

OTHER PUBLICATIONS

Machine Translation: JP-03169709-A, Sakuno, Hiroaki, (Year: 2021).*
Machine Translation: JP-2007106174-A, Koga, Hiroaki, (Year: 2021).*
Machine Translation: JP-5161901-A, Arimura, Iwao, (Year: 2021).*
European Search Report, European Patent Office, Application No. 19180505.0, dated Oct. 23, 2019, 7 pages.

* cited by examiner

PNEUMATIC TYRE

BACKGROUND ART

Field of the Disclosure

The present disclosure relates to pneumatic tyres, and more particularly to a pneumatic tyre, by being improved carcass structure, capable of improving durability while suppressing reduction in rolling resistance performance.

Description of the Related Art

In accordance with strengthening $CO_2$ regulation, it has been expected that next-generation vehicles, e.g., hybrid vehicles (HV) and electric vehicles (EV), increase. These kinds of vehicles tend to have extremely heavy weights to ensure a long cruising distance.

SUMMARY OF THE DISCLOSURE

As a result, for the above-mentioned vehicles, a high load capacity tyre that can support high load is necessary. However, in high load capacity tyres, there has been a problem to improve durability under high load conditions.

In order to compatible load capacity with durability of tyres, enhancing rubber compositions and cord materials, adding reinforcing plies, and thickening gauges of around bead portions may be considered. Unfortunately, these approaches may bring into deterioration of rolling resistance property. In view of the above circumstances, the inventor has been proposed a new approach to a carcass structure.

The following patent document 1 may be a reference as a carcass profile.

PATENT DOCUMENT

[Patent document 1] JP2017-121875A1

In view of the above problems in the conventional art, the present disclosure has an object to provide a pneumatic tyre, by being improved carcass structure, capable of improving durability while suppressing reduction in rolling resistance performance.

According to one aspect of the disclosure, a pneumatic tyre includes a carcass including a carcass main portion extending between bead cores disposed in respective bead portions through a tread portion and sidewall portions, and bead apex rubbers each extending radially outwardly from the respective bead cores, each bead apex rubber having an inner side surface in a tyre axial direction. In a tyre cross-section under a standard inflated state such that the tyre is mounted on a standard wheel rim and inflated to a standard pressure, a ratio h1/H of a carcass-maximum-width height h1 from a bead baseline to a carcass-maximum height H from the bead baseline is equal to or less than 50%, and in at least one bead portion, an angle of a tangent line touching the inner surface of the bead apex rubber at an intersection of a tyre radial reference line passing a rim-width location of the standard wheel with the inner side surface of the bead apex rubber is in a range of from 55 to 75 degrees with respect to the tyre radial reference line.

In another aspect of the disclosure, the carcass further may include a carcass turn-up portion connected to the carcass main portion and turned up around the bead core in the at least one bead portion, wherein in the at least one bead portion, the bead apex rubber may include an inner apex portion extending radially outwardly from a radially outer surface of the bead core, the inner apex portion having a triangular cross-sectional shape including an axially outer inclined surface, and an outer apex portion extending radially outwardly from a bottom surface thereof which extends along the outer inclined surface of the inner apex portion, and wherein the carcass turn-up portion may extend through between the outer inclined surface of the inner apex portion and the bottom surface of the outer apex portion.

In another aspect of the disclosure, a ratio h2/h1 of a radial height h2 from the bead baseline to a radially outer end of the outer apex portion to the carcass-maximum-width height h1 may be in a range of from 0.7 to 1.0.

In another aspect of the disclosure, the at least one bead portion may have a maximum thickness location where a thickness (t0) from an axially inner surface of the outer apex portion to a tyre outer surface is maximum, and wherein a ratio h3/h2 of a radial height h3 from the bead baseline to the maximum thickness location on the tyre outer surface to a radial height h2 from the bead baseline to a radially outer end of the outer apex portion may be in a range of from 0.3 to 0.6.

In another aspect of the disclosure, at the maximum thickness location, a thickness t1 of the outer apex portion may be in a range of from 0.52 to 0.6 times the maximum thickness t0.

In another aspect of the disclosure, at the maximum thickness location, a whole thickness TA of the at least one bead portion from a tyre inner surface to the tyre outer surface may be in a range of from 9 to 15 mm.

In another aspect of the disclosure, a radial height h5 from the radially outer surface of the bead core to a radially outer end of the inner apex portion may be in a range of from 10 to 20 mm.

As used herein, "the standard wheel" rim is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

DESCRIPTION OF THE PREFERRED EMBODIMENTS

An embodiment of the present disclosure will be explained below with reference to the accompanying drawings.

Figure 1:
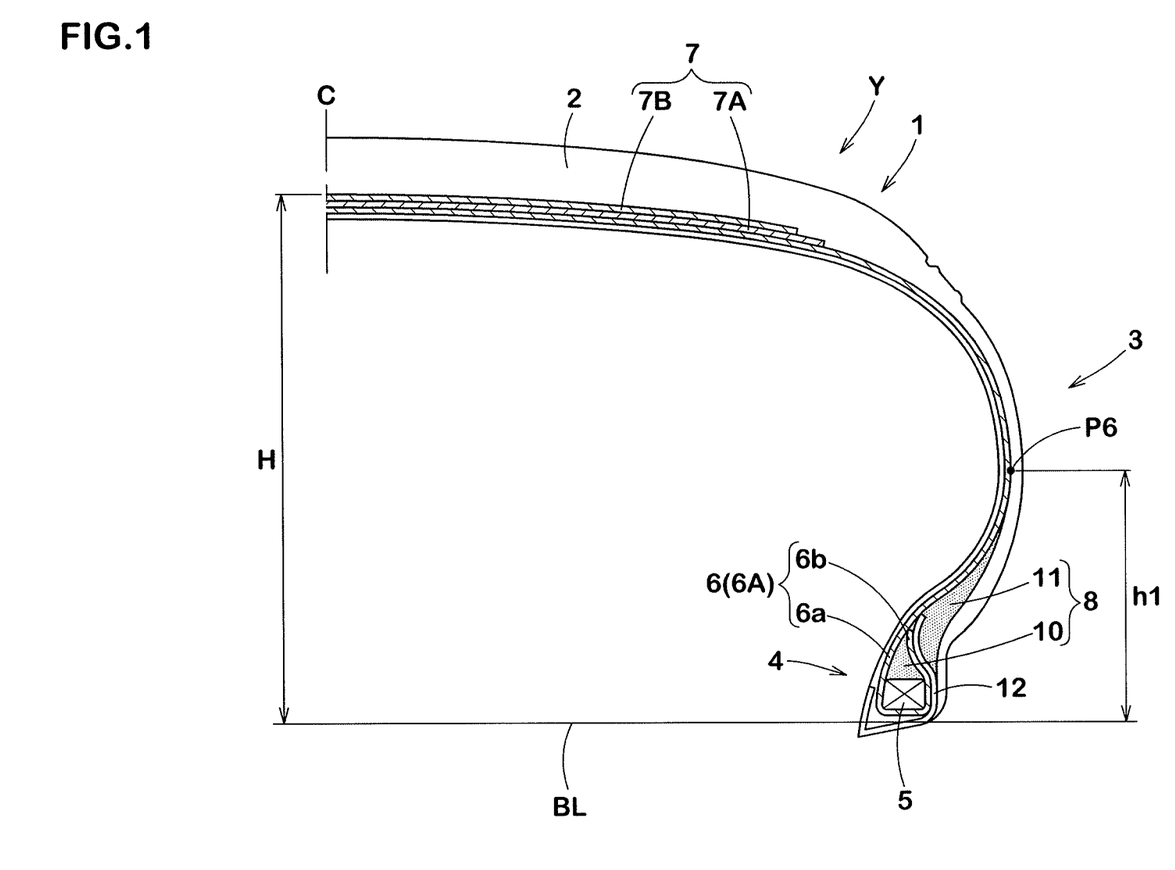
FIG. 1 is a meridian cross-sectional view of a pneumatic tyre under a standard inflated state according to a present embodiment.
Figure 2:
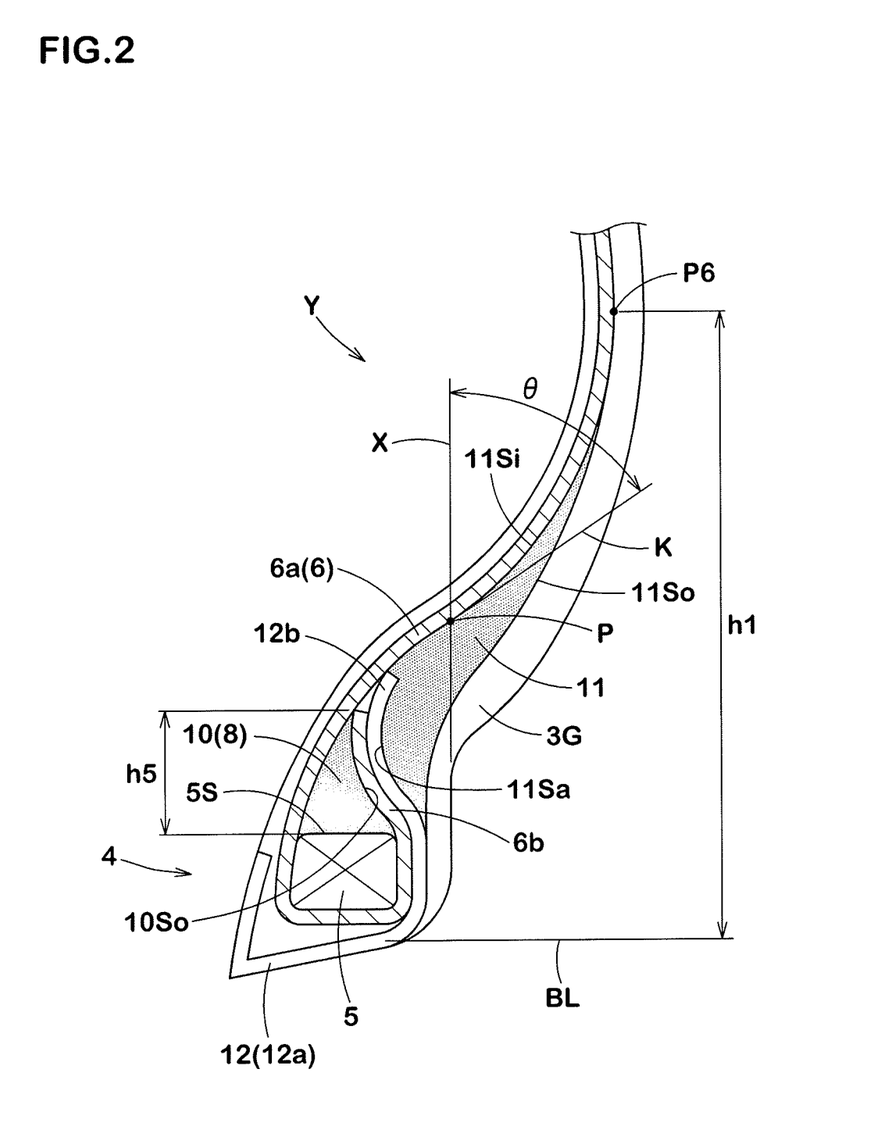
FIGS. 2 and 3 each are enlarged views of a bead portion of FIG. 1.

FIG. 1 illustrates a meridian cross-sectional view of a pneumatic tyre 1 under a standard inflated state Y. In FIGS. 1 and 2, the standard wheel rim is omitted for convenience sake. Note that the pneumatic tyre has a substantially symmetrical shape with respect to the tyre equatorial plane C.

As illustrated in FIG. 1, the pneumatic tyre 1 according to the present embodiment includes a carcass 6 extending between bead cores 5 disposed in respective bead portions 4 through a tread portion 2 and sidewall portions 3, and bead apex rubbers 8 disposed in the respective bead portions 4.

The carcass 6 includes a toroidal carcass main portion 6a extending between the bead cores 5, and one or more carcass turn-up portions 6b each turned up around a respective one of the bead cores 5 from the axially inside to the outside of the tyre. The carcass 6 includes at least one carcass ply 6A of carcass cords which are oriented an angle of from 75 to 90 degrees with respect to the tyre circumferential direction, for example. In this embodiment, the carcass 6 is made of a single carcass ply 6A.

In this embodiment, a belt layer 7 for reinforcing the tread portion 2 is disposed on the carcass 6 in the tread portion 2. The belt layer 7 includes at least two belt plies 7A and 7B of belt cords which are oriented an angle of from 10 to 35 degrees with respect to the tyre circumferential direction. In this embodiment, the belt layer 7 is made of two belt plies. The belt plies 7A and 7B are arranged such that belt cords of each ply cross with one another.

A band layer (not illustrated) may be disposed on the belt layer 7 in order to improve high speed traveling performance. The band layer is made of one or more band cords which are wound spirally in the tyre circumferential direction.

In each bead portion 4, the bead apex rubber 8 extends radially outwardly from the bead core 5. In this embodiment, the bead apex rubber 8, for example, includes an inner apex portion 10 and an outer apex portion 11.

As illustrated in FIG. 2, the inner apex portion 10 has a triangular cross-sectional shape which extends radially outwardly in a tapered manner from a radially outer surface 5S of the bead core 5. A radial height h5 from the outer surface 5S to a radially outer end of the inner apex portion 10 is in a range of from 10 to 20 mm. The inner apex portion 10 includes an axially outer inclined surface 10So.

The outer apex portion 11 includes a bottom surface 11Sa that extends along the outer inclined surface 10So of the inner apex portion 10, and the outer apex 11 extends radially outwardly in a tapered manner from the bottom surface 11Sa. The carcass turn-up portion 6b extends to the carcass main portion 6a through between the outer inclined surface 10So and the bottom surface 11Sa.

In this embodiment, the bead portions 4 is provided with a chafer 12 for suppressing a rim slippage. The chafer 12 includes a main portion 12a extending along a radially inner surface of the bead portion 4 and an auxiliary portion 12b bent up at a bead heel so as to lie on the carcass turn-up portion 6b. The chafer 12, for example, may be made of a rubber sheet or a cloth coated with rubber. Alternatively, the chafer 12 may be omitted.

In this embodiment, a space which is surrounded by the carcass main portion 6a, the carcass turn-up portion 6b and outer surface 5S of the bead cores 5 is filled with the inner apex portion 10. The bottom surface 11Sa of the outer apex portion 11, in this embodiment, is adjacent to the carcass turn-up portion 6b through the chafer 12. An axially inner surface 11Si of the outer apex portion 11 is adjacent to an axially outer surface of the carcass main portion 6a. Further, an axially outer surface 11So of the outer apex portion 11 is adjacent to a sidewall rubber 3G which forms an outer surface of the sidewall portion.

Rubber hardness of the inner apex portion 10 and the outer apex portion 11, for example, is in a range of from 65 to 90 degrees, and which is greater than that of the sidewall rubber 3G. Further, it is preferable that the rubber hardness of the inner apex portion 10 is equal to or more than the rubber hardness of the outer apex portion 11. As used herein, the above-mentioned rubber hardness shall mean the durometer type-A hardness measured according to Japanese Industrial Standard JIS-K6253.

Next, in a meridian cross-section of the pneumatic tyre 1 under the standard inflated state Y, (1) a ratio h1/H of a carcass-maximum-width height h1 from the bead baseline BL to a carcass-maximum height H (shown in FIG. 1) from the bead baseline BL is equal to or less than 50%, preferably equal to or less than 48%, more preferably equal to or less than 45%.

As used herein, the carcass-maximum-width height h1 shall mean a radial height from the bead baseline BL to the location P6 where the carcass main portion 6a swells most in the tyre axial direction (i.e., the location P6 defining the axial maximum width of the carcass main portion 6a). Further, as used herein, the carcass-maximum height H shall mean a radial height from the bead baseline BL to the carcass main portion 6a at the tyre equatorial plane C.

In addition, in a meridian cross-section of the pneumatic tyre 1 under the standard inflated state Y, (2) in at least one bead portion 4, an angle θ of a tangent line K touching the inner surface of the bead apex rubber at an intersection P of a tyre radial reference line X passing a rim-width location of the standard wheel with the inner side surface of the bead apex rubber 8 is in a range of from 55 to 75 degrees with respect to the tyre radial reference line X.

The pneumatic tyre 1 that is satisfied the above conditions (1) and (2) has a specific profile (e.g., an otafuku shape) around the bead portion 4 under the standard inflated state Y. This profile is such that the carcass main portion 6a swells well on the bead portion side to have a low carcass-maximum-width height, and which is similar to a tyre profile when loaded state.

Thus, the pneumatic tyre 1 according to the embodiment can suppress the shape change of the bead portion 4 before and after receiving tyre load. As a result, it is possible to improve durability of the tyre. Further, suppressing the shape change brings down energy loss when traveling, thus improving or maintaining rolling resistance performance.

Figure 4A:
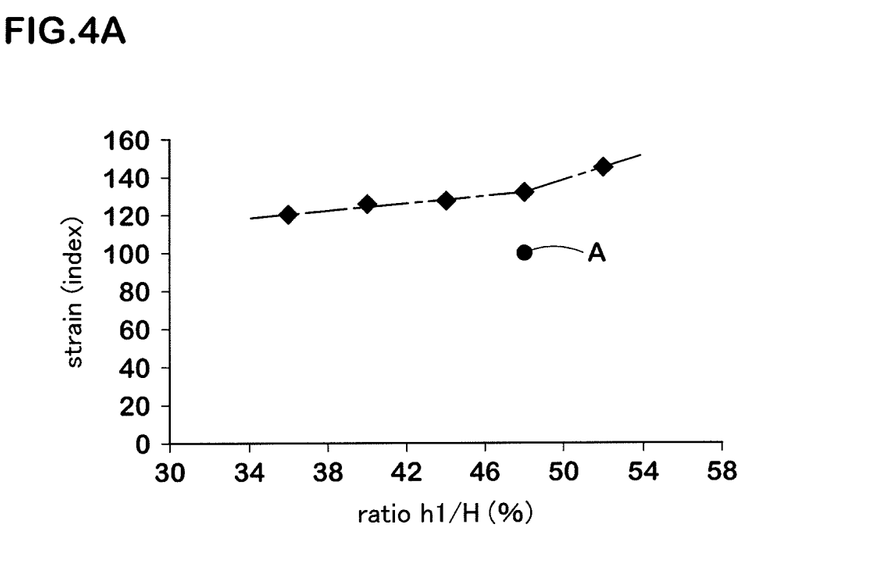
FIG. 4A is a graph showing a relationship between strain and a ratio h1/H.
Figure 4B:
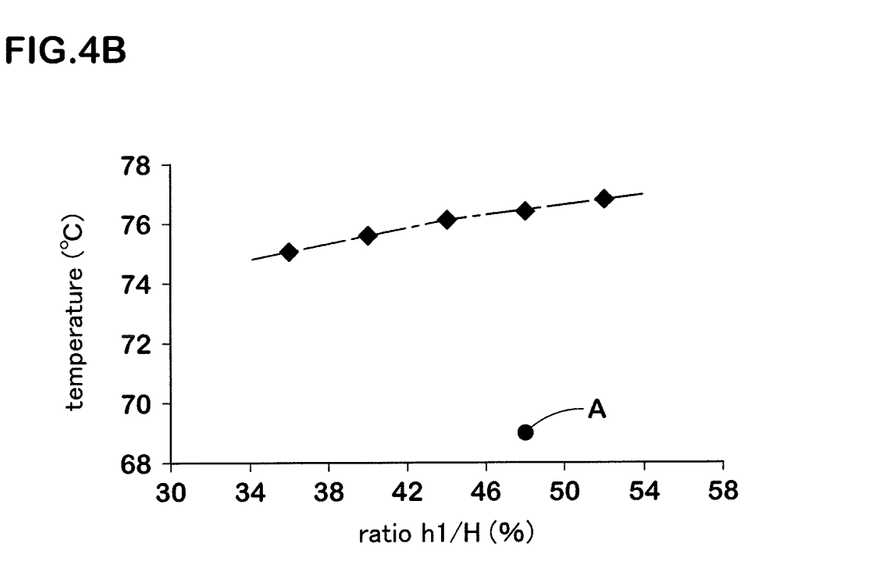
FIG. 4B is a graph showing a relationship between temperature and the ratio h1/H.

FIGS. 4A and 4B show an example of results of a test which was conducted by the inventor. In the test, pneumatic tyres having a size of 225/45R17 were prototyped. Note that the pneumatic tyres had the same internal structure as with each other while having different values of the ratio h1/H. Then, a load test was conducted under the condition of inner pressure of 290 kPa and tyre load of 8.94 kN. Note that the tyre load used in the condition is about 1.6 kN heavier than the tyre load defined by EXTRA LOAD XL=98. After loading, strain at a breaking prediction position of the carcass (near the carcass-maximum-width location P6) was measured, and the relationship between the strain and the ratio h1/H was graphed as shown in FIG. 4A. As shown in FIG. 4A, it was confirmed that the carcass tends to difficult to break as the ratio h1/H is decreased because the strain is decreased.

In addition, under the same load condition as the above, these test tyres were made to run on a drum tester at speed of 100 km/h, and then temperature at the breaking prediction position of the carcass (near the carcass-maximum-width location P6) of each test tyre was measured. FIG. 4B shows the relationship between the temperature and the ratio h1/H.

As shown in FIG. 4B, it was confirmed that the carcass tends to difficult to break as the ratio h1/H is decreased because the temperature lowers.

In FIGS. 4A and 4B, each point (A) shows the strain and the temperature of the tyre having the ratio h1/H of 48% upon receiving load of 7.35 kN corresponding to a condition of EXTRA LOAD XL=98.

When the ratio h1/H exceeds 50%, a profile around the bead portion tends to be different from one under the loaded state, thus being difficult to achieve the above-mentioned effect. Note that when the ratio h1/H becomes too small, it may be difficult to manufacture tyres having such a low ratio because a carcass profile is prone to be bent unnaturally. From these viewpoints, it is preferable that the lower limit of the ratio h1/H is 39% or more.

Similarly, when the angle θ becomes less than 55 degrees, a profile around the bead portion tends to be different from one under the loaded state, thus being difficult to achieve the above-mentioned effect. Further, when the angle θ exceeds 75 degrees, it may be difficult to manufacture tyres having such a low ratio because a carcass profile is prone to be bent unnaturally.

As mentioned above, in this embodiment, the bead apex rubber 8 includes the inner apex portion 10 and the outer apex portion 11, and the carcass turn-up portion 6b is sandwiched between the inner apex portion 10 and the outer apex portion 11. In addition, the radial height h5 of the inner apex portion 10 is set small in a range of from 10 to 20 mm.

That is, the radially outer end of the carcass turn-up portion 6b terminates at a low position so as to have a radial height corresponding to about a rim-flange height. Thus, when the bead portion is deformed, compressive strain acting on the carcass turn-up portion 6b and a terminal end thereof can be reduced, and thus durability of the tyre is further improved.

Figure 3:
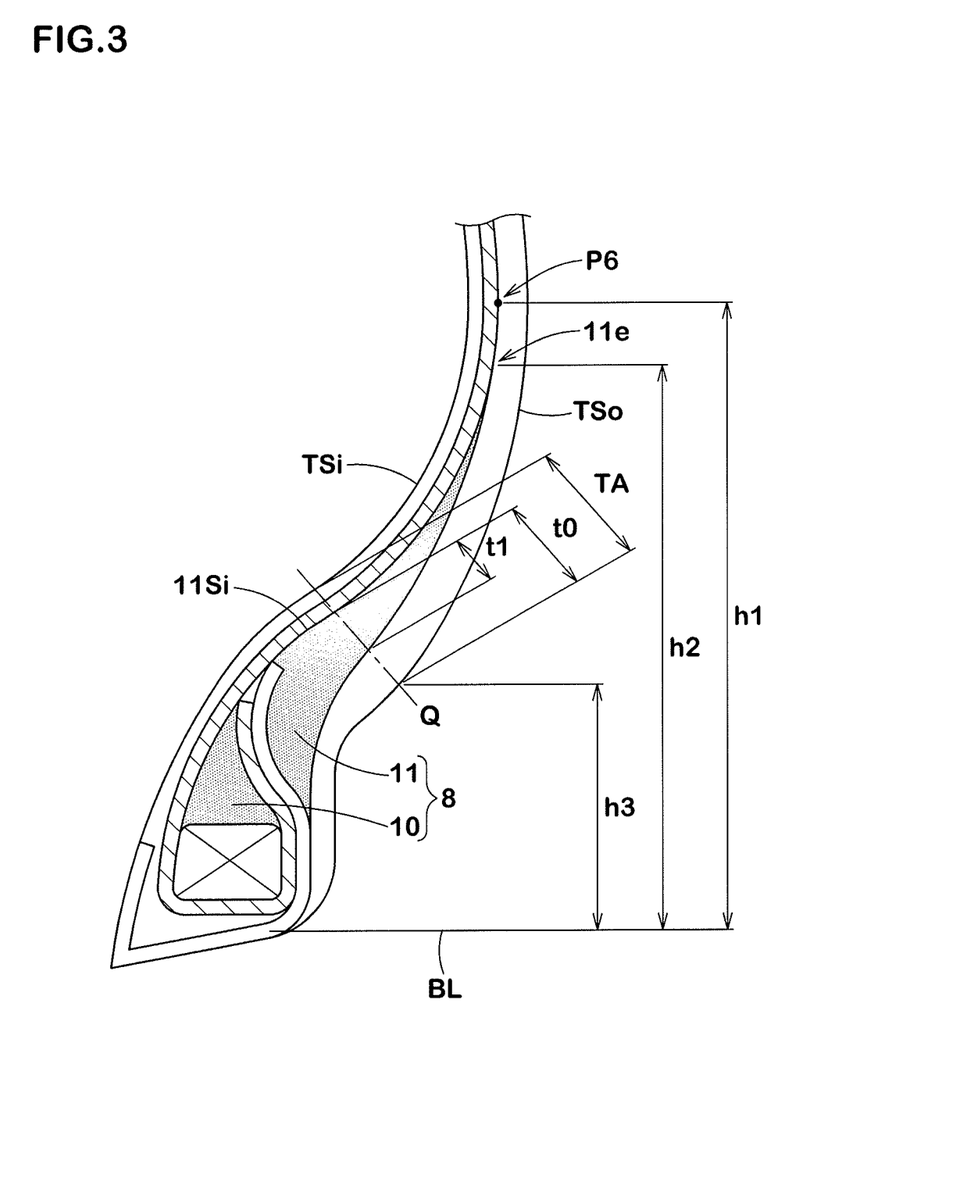

In order to do that, as illustrated in FIG. 3, it is preferable that a ratio h2/h1 of a radial height h2 from the bead baseline BL to the radially outer end 11e of the outer apex portion 11 to the carcass-maximum-width height h1 is in a range of from 0.7 to 1.0.

The bead portion 4 has a maximum thickness location Q where a thickness t0 from the axially inner surface 11Si of the outer apex portion 11 to the tyre outer surface TSo is maximum. It is preferable that a ratio h3/h2 of a radial height h3 from the bead baseline BL to the maximum thickness location Q on the tyre outer surface TSo to the above-mentioned radial height h2 is in a range of from 0.3 to 0.6.

It is preferable that at the maximum thickness location Q, a thickness t1 of the outer apex portion 11 is in a range of from 0.52 to 0.6 times the maximum thickness t0. Further, it is preferable that at the maximum thickness location Q, a whole thickness TA of the bead portion 4 from the tyre inner surface TSi to the tyre outer surface TSo is in a range of from 9 to 15 mm.

When the ratio h2/h1 becomes less than 0.7, it may be difficult to ensure sufficient rubber volume of the outer apex portion 11. Thus, durability of the tyre is prone to deteriorate due to less bead stiffness. On the other hand, when the ratio h2/h1 exceeds 1.0, rolling resistance performance is prone to deteriorate due to an excessive rubber volume of the outer apex portion 11.

When the ratio h3/h2 becomes less than 0.3, durability of the tyre is prone to deteriorate due to less bead stiffness. On the other hand, when the ratio h3/h2 exceeds 0.6, rolling resistance performance is prone to deteriorate.

At the maximum thickness location Q, when the thickness t1 is less than 0.52 times the maximum thickness t0, it may be difficult to ensure sufficient rubber volume of the outer apex portion 11. Thus, durability of the tyre is prone to deteriorate due to less bead stiffness. On the other hand, when the thickness t1 exceeds 0.60 times the maximum thickness t0, rolling resistance performance is prone to deteriorate due to an excessive rubber volume of the outer apex portion 11.

While the particularly preferable embodiments in accordance with the present disclosure have been described in detail, the present disclosure is not limited to the illustrated embodiments, but can be modified and carried out in various aspects.

Example

Pneumatic tyres (size: 225/45R17) having a structure shown in FIG. 1 were prototyped based on Table 1. Then, a durability test and a rolling resistance performance test for these test tyres were conducted. Note that these tyres are different from each other only the specifications listed in Table 1.

(1) Durability Test:

Each test tyre was made to run on a drum tester under the following condition, and a traveling distance until the tyre was broken was measured:

rim size 7.5 J;

inner pressure 290 kPa;

tyre load 8.94 kN; and speed: 100 km/h.

The test results are shown in Table 1 using an index based on Ref 0.1 being 100. The larger the value, the better the durability is.

(2) Rolling Resistance Test:

Rolling resistance was measured on each test tyre using a rolling resistance tester under the following condition:

rim size 7.5 J;

inner pressure 250 kPa;

tyre load 5.26 kN; and speed 80 km/h.

The test results are shown in table 1 using an index based on Ref. 1 being 3.00. The larger the value, the smaller the rolling resistance is.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
| --- | --- | --- | --- | --- | --- | --- | --- | --- | --- | --- | --- | --- | --- | --- | --- |
| Height H (mm) | 86 | 86 | 86 | 86 | 86 | 86 | 86 | 86 | 86 | 86 | 86 | 86 | 86 | 86 | 86 |
| Height h1 (mm) | 44 | 45 | 36 | 37 | 39 | 43 | 37 | 37 | 37 | 37 | 37 | 37 | 37 | 37 | 37 |
| Angle θ (deg.) | 50 | 52 | 65 | 65 | 65 | 55 | 58 | 75 | 65 | 65 | 65 | 65 | 65 | 65 | 65 |
| Height h2 (mm) | 45 | 32 | 32 | 32 | 32 | 30 | 32 | 32 | 28 | 37 | 32 | 32 | 32 | 32 | 32 |
| Height h3 (mm) | 5 | 16 | 16 | 16 | 16 | 16 | 16 | 16 | 16 | 16 | 10 | 19 | 16 | 16 | 16 |
| Thickness TA (mm) | 8.5 | 12 | 12 | 12 | 12 | 12 | 12 | 12 | 12 | 12 | 12 | 12 | 12 | 12 | 11 |

TABLE 1-continued

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| Thickness t1 (mm) | 4 | 7 | 7 | 7 | 7 | 7 | 7 | 7 | 7 | 7 | 7 | 7 | 6 | 7.5 | 7 |
| Thickness t0 (mm) | 7.8 | 12.2 | 12.2 | 12.2 | 12.2 | 12.2 | 12.2 | 12.2 | 12.2 | 12.2 | 12.2 | 12.2 | 11.5 | 12.5 | 12.2 |
| h1/H | 0.51 | 0.52 | 0.42 | 0.43 | 0.45 | 0.50 | 0.43 | 0.43 | 0.43 | 0.43 | 0.43 | 0.43 | 0.43 | 0.43 | 0.43 |
| h2/h1 | 1.02 | 0.71 | 0.89 | 0.86 | 0.82 | 0.70 | 0.86 | 0.86 | 0.76 | 1 | 0.86 | 0.86 | 0.86 | 0.86 | 0.86 |
| h3/h2 | 0.11 | 0.50 | 0.50 | 0.50 | 0.50 | 0.53 | 0.50 | 0.50 | 0.57 | 0.44 | 0.31 | 0.59 | 0.50 | 0.50 | 0.50 |
| t1/to | 0.51 | 0.57 | 0.57 | 0.57 | 0.57 | 0.57 | 0.57 | 0.57 | 0.57 | 0.57 | 0.57 | 0.57 | 0.52 | 0.60 | 0.57 |
| Durability | 100 | 100 | 115 | 120 | 110 | 105 | 110 | 105 | 105 | 115 | 110 | 108 | 115 | 115 | 118 |
| Rolling resistance | 3.00 | 2.50 | 3.00 | 3.00 | 3.00 | 2.75 | 2.75 | 3.00 | 3.00 | 2.50 | 3.00 | 2.75 | 3.00 | 2.75 | 3.00 |

As shown in Table 1, it is confirmed that the example tyres can improve durability while suppressing reduction in rolling resistance performance.

What is claimed is:

1. A pneumatic tyre comprising:
a carcass comprising a carcass main portion extending between bead cores disposed in respective bead portions through a tread portion and sidewall portions and a carcass turn-up portion connected to the carcass main portion and turned up around a bead core in at least one bead portion; and
in the at least one bead portion, a bead apex rubber comprises an inner apex portion extending radially outward from a radially outer surface of the bead core, wherein the inner apex portion has a triangular cross sectional shape comprising an axially outer inclined surface, and an outer apex portion extending radially outwardly from a bottom surface thereof which extends along the axially outer inclined surface of the inner apex portion, the carcass turn-up portion extends through between the axially outer inclined surface of the inner apex portion and the bottom surface of the outer apex portion,
in a tyre cross-section under a standard inflated state such that the tyre is mounted on a standard wheel rim and inflated to a standard pressure, a ratio h1/H of a carcass-maximum-width height h1 from a bead baseline to a carcass-maximum height H from the bead baseline is equal to or less than 45%, and
in the at least one bead portion, an angle of a tangent line touching an inner side surface of the outer apex portion of the bead apex rubber at an intersection of a tyre radial reference line passing a rim-width location of the standard wheel with the inner side surface of the outer apex portion of the bead apex rubber is in a range of from 55 to 75 degrees with respect to the tyre radial reference line.

2. The pneumatic tyre according to 1,
wherein a radial height (h5) from the radially outer surface of the bead core to a radially outer end of the inner apex portion is in a range of from 10 to 20 mm.

3. The pneumatic tyre according to claim 1,
the inner apex portion having a first rubber hardness,
the outer apex portion having a second rubber hardness, and
the first rubber hardness of the inner apex portion is greater than the second rubber hardness of the outer apex portion.

4. The pneumatic tyre according to claim 1,
wherein the angle of the tangent line touching the inner side surface of the outer apex portion of the bead apex rubber at the intersection of the tyre radial reference line passing the rim-width location of the standard wheel with the inner side surface of the outer apex portion of the bead apex rubber is in a range of from 65 to 75 degrees with respect to the tyre radial reference line.

5. The pneumatic tyre according to claim 1,
wherein a ratio h2/h1 of a radial height h2 from the bead baseline to a radially outer end of the outer apex portion to the carcass-maximum-width height h1 is in a range of from 0.7 to 1.0.

6. The pneumatic tyre according to claim 5,
wherein the at least one bead portion has a maximum thickness location where a thickness (t0) from an axially inner surface of the outer apex portion to a tyre outer surface is maximum, and
wherein a ratio h3/h2 of a radial height h3 from the bead baseline to the maximum thickness location on the tyre outer surface to a radial height h2 from the bead baseline to a radially outer end of the outer apex portion is in a range of from 0.3 to 0.6.

7. The pneumatic tyre according to claim 5,
wherein a radial height (h5) from the radially outer surface of the bead core to a radially outer end of the inner apex portion is in a range of from 10 to 20 mm.

8. The pneumatic tyre according to claim 1,
wherein the at least one bead portion has a maximum thickness location where a thickness (t0) from an axially inner surface of the outer apex portion to a tyre outer surface is maximum, and
wherein a ratio h3/h2 of a radial height h3 from the bead baseline to the maximum thickness location on the tyre outer surface to a radial height h2 from the bead baseline to a radially outer end of the outer apex portion is in a range of from 0.3 to 0.6.

9. The pneumatic tyre according to claim 8,
wherein a radial height (h5) from the radially outer surface of the bead core to a radially outer end of the inner apex portion is in a range of from 10 to 20 mm.

10. The pneumatic tyre according to claim 8,
wherein at the maximum thickness location, a whole thickness (TA) of the at least one bead portion from a tyre inner surface to the tyre outer surface is in a range of from 9 to 15 mm.

11. The pneumatic tyre according to claim 10,
wherein a radial height (h5) from the radially outer surface of the bead core to a radially outer end of the inner apex portion is in a range of from 10 to 20 mm.

12. The pneumatic tyre according to claim 8,
wherein at the maximum thickness location, a thickness (t1) of the outer apex portion is in a range of from 0.52 to 0.6 times the maximum thickness (t0).

13. The pneumatic tyre according to claim 12,
wherein at the maximum thickness location, a whole thickness (TA) of the at least one bead portion from a tyre inner surface to the tyre outer surface is in a range of from 9 to 15 mm.

14. The pneumatic tyre according to claim 12, wherein a radial height (h5) from the radially outer surface of the bead core to a radially outer end of the inner apex portion is in a range of from 10 to 20 mm.

\* \* \* \* \*